United States Patent
Haynes et al.

(10) Patent No.: US 10,718,457 B2
(45) Date of Patent: Jul. 21, 2020

(54) APPARATUS FOR CONNECTING WELLSITE TUBING

(71) Applicants: Michael Haynes, Bluffton (CA); Sean James Peter David, Calgary (CA); Kevin Kelm, Calmar (CA)

(72) Inventors: Michael Haynes, Bluffton (CA); Sean James Peter David, Calgary (CA); Kevin Kelm, Calmar (CA)

(73) Assignee: Delensol Corp., Bluffton, Alberta (CA)

( * ) Notice: Subject to any disclaimer, the term of this patent is extended or adjusted under 35 U.S.C. 154(b) by 108 days.

(21) Appl. No.: 15/954,130

(22) Filed: Apr. 16, 2018

(65) Prior Publication Data
US 2019/0316719 A1    Oct. 17, 2019

(51) Int. Cl.
| | | |
|---|---|---|
| *E21B 17/18* | (2006.01) | |
| *E21B 43/12* | (2006.01) | |
| *E21B 43/08* | (2006.01) | |
| *E21B 43/14* | (2006.01) | |
| *F16L 39/00* | (2006.01) | |
| *E21B 17/042* | (2006.01) | |
| *F16L 15/04* | (2006.01) | |

(52) U.S. Cl.
CPC .......... *F16L 39/005* (2013.01); *E21B 17/042* (2013.01); *E21B 17/18* (2013.01); *F16L 15/04* (2013.01); *F16L 2201/40* (2013.01)

(58) Field of Classification Search
None
See application file for complete search history.

(56) References Cited

U.S. PATENT DOCUMENTS

| | | |
|---|---|---|
| 3,065,807 A | 11/1962 | Wells |
| 3,638,970 A | 2/1972 | Sandquist |
| 4,744,420 A | 5/1988 | Patterson |
| 6,464,261 B1 | 10/2002 | Dybevik et al. |
| 77,073,597 | 7/2006 | Williams |
| 7,886,832 B2 | 2/2011 | Partouche |
| 9,702,231 B2 * | 7/2017 | Elrick ..................... E21B 17/18 |
| 2011/0024102 A1 | 2/2011 | Rig |
| 2012/0048569 A1 | 3/2012 | Williams |
| 2015/0130183 A1 | 5/2015 | Eaton |
| 2017/0145757 A1 | 5/2017 | Ayasse |

FOREIGN PATENT DOCUMENTS

| | | |
|---|---|---|
| CN | 205206762 | 5/2016 |
| CN | 105756579 A | 7/2016 |
| DE | 3149537 | 7/1983 |
| WO | WO2016000068 A1 | 7/2014 |

* cited by examiner

*Primary Examiner* — Matthew R Buck
*Assistant Examiner* — Douglas S Wood
(74) *Attorney, Agent, or Firm* — Steve LeBlanc, LLC

(57) ABSTRACT

An apparatus for connecting a first wellsite tube to a second wellsite tube includes a collar configured to engage with outer conduits of the first and second wellsite tubes. A coupling is disposed inside the collar and includes a first end axially disposed from a second end. A first structure is configured to provide sliding engagement between the first end of the coupling and an inner conduit of the first wellsite tube. A second structure is configured to provide threaded engagement between the second end of the coupling and an inner conduit of the second wellsite tube. A plurality of radially extending ribs are disposed between the opposing ends of the collar and support the coupling inside the collar.

17 Claims, 4 Drawing Sheets

APPARATUS FOR CONNECTING WELLSITE TUBING

FIELD OF THE INVENTION

The present invention generally involves an apparatus for connecting wellsite or oilfield tubing. In particular embodiments, the present invention may be used to connect two wellsite tubes together, where each wellsite tube includes an inner conduit located inside an outer conduit.

BACKGROUND OF THE INVENTION

Wellsite or oilfield tubing is commonly used with conventional service rigs to transmit fluid between the service rig and a wellbore or other location at the wellsite. The wellsite tubing typically extends several hundred or even several thousand feet in length, depending on the depth of the wellbore. As a result, the wellsite tubing necessarily includes a large number of sections that are repeatedly added or removed to vary the length of the tubing as needed. Due to varying lengths of the wellsite tubing and the inherent movement between the service rig and the wellsite, the ability to efficiently, reliably, and securely connect the sections of the tubing while also allowing flexibility in the connections is a desirable design consideration.

Wellsite tubing often includes multiple parallel conduits that provide multiple flow paths for the fluid flow. In some wellsite tubing, the parallel conduits are arranged side-by-side, while in other wellsite tubing, the parallel conduits are arranged with an inner conduit surrounded by an outer conduit. The arrangement of parallel conduits in the wellsite tubing creates additional operational challenges in connecting multiple sections of the tubing. In practice this is typically achieved by first assembling the outer conduit followed by inserting or running the inner conduit inside the assembled outer conduit. In addition to doubling the number of connections required to be made, this method limits or makes impossible the placement of devices at multiple points in the wellsite tubing. Therefore, the need exists for an improved apparatus that can efficiently, reliably, and securely connect sections of wellsite tubing having parallel conduits, and embodiments of the present invention provide a low-cost, reliable method for creating a multi-channel wellsite tubing.

BRIEF DESCRIPTION OF THE INVENTION

Aspects and advantages of the invention are set forth below in the following description, or may be obvious from the description, or may be learned through practice of the invention.

One embodiment of the present invention is an apparatus for connecting a first wellsite tube to a second wellsite tube, wherein each wellsite tube has an inner conduit and an outer conduit. The apparatus includes a collar configured to engage with the outer conduits of the first and second wellsite tubes. A coupling is disposed inside the collar and includes a first end axially disposed from a second end. A first means is configured to provide sliding engagement between the first end of the coupling and the inner conduit of the first wellsite tube. A second means is configured to provide threaded engagement between the second end of the coupling and the inner conduit of the second wellsite tube. A plurality of radially extending ribs are disposed between the opposing ends of the collar and support the coupling inside the collar.

An alternate embodiment of the present invention is an apparatus for connecting a first wellsite tube to a second wellsite tube, wherein each wellsite tube has an inner conduit and an outer conduit. The apparatus includes a collar with internal threads at opposing ends, and the internal threads are configured to provide threaded engagement with the outer conduits of the first and second wellsite tubes. A coupling is disposed inside the collar and includes a first end axially disposed from a second end. A first means is configured to engage the first end of the coupling to the inner conduit of the first wellsite tube. A second means is configured to engage the second end of the coupling to the inner conduit of the second wellsite tube. A plurality of radially extending ribs are disposed between the opposing ends of the collar and support the coupling inside the collar.

In yet another embodiment of the present invention, an apparatus for connecting a first wellsite tube to a second wellsite tube, wherein each wellsite tube string has an inner conduit and an outer conduit, includes a collar with external threads at opposing ends, wherein the external threads are configured to provide threaded engagement with the outer conduits of the first and second wellsite tubes. A coupling is disposed inside the collar, wherein the coupling includes a first end axially disposed from a second end. A first means is configured to engage the first end of the coupling to the inner conduit of the first wellsite tube. A second means is configured to engage the second end of the coupling to the inner coupling of the second wellsite tube. A plurality of radially extending ribs are disposed between the opposing ends of the collar and support the coupling inside the collar.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
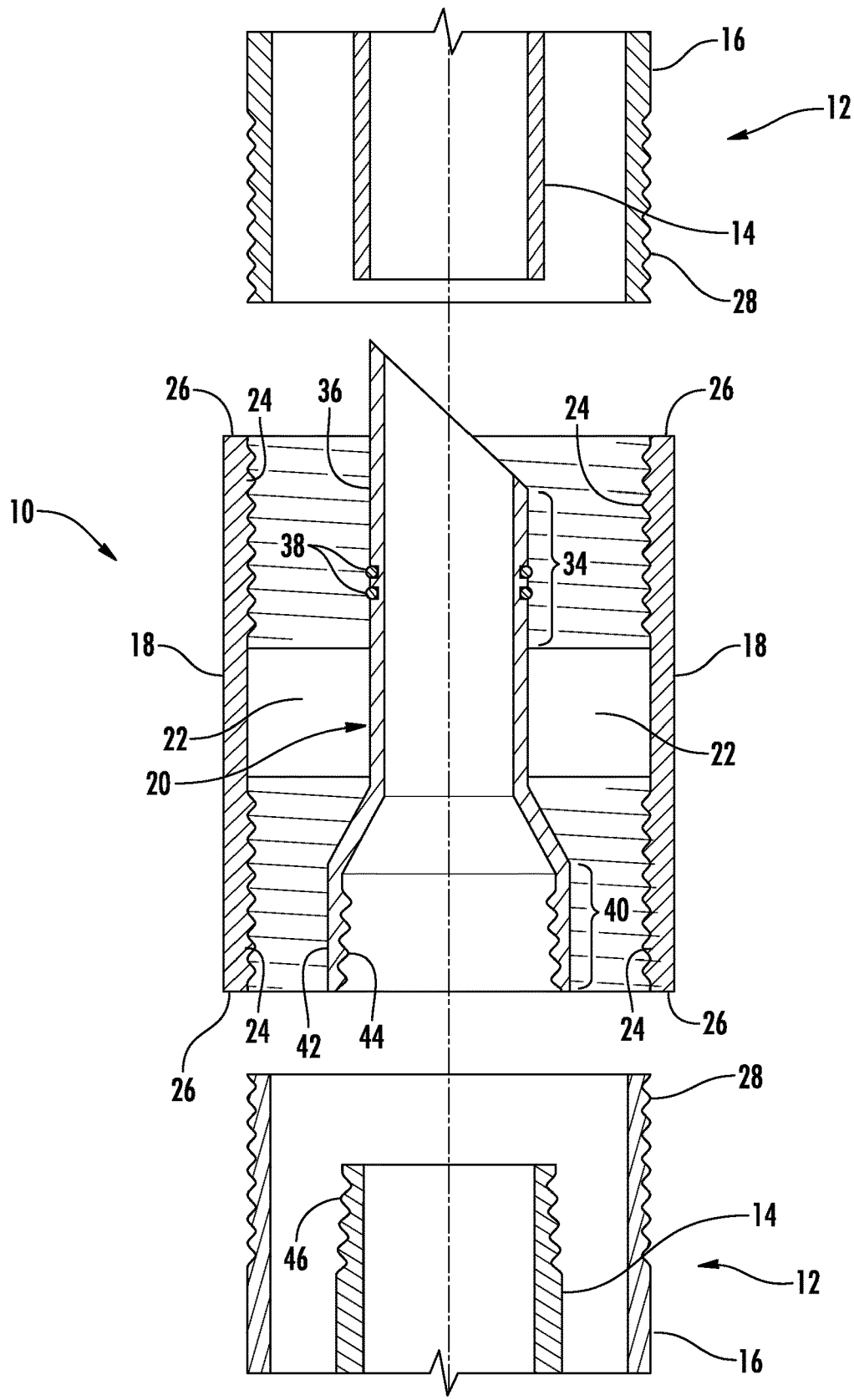
FIG. 1 is a side plan view of an apparatus according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, the terms "upstream" and "downstream" refer to the relative location of components in a fluid pathway. For example, component A is upstream of component B if a fluid flows from component A to component B. Conversely, component B is downstream of component A if component B receives a fluid flow from component A. As used herein, the term "axial" refers to a direction of flow through an object; the term "radial" refers to a direction extending away from the center of an object or normal to the "axial" direction, and the term "circumferential" refers to a direction extending around the circumference or perimeter of an object.

Embodiments of the present invention provide an apparatus 10 for connecting wellsite tubes 12 having an inner conduit 14 surrounded by an outer conduit 16. As used herein, the term "wellsite tube" is a term of art in the oilfield industry that refers to the column, or string, of tubing that transmits fluid to a wellbore. The apparatus 10 includes fittings and joints specifically designed and arranged to efficiently and securely connect the wellsite tubes 12, while still providing flexibility to accommodate movement between the apparatus 10 and the wellsite tubes 12. One of ordinary skill in the art will readily appreciate that the illustration and description of the wellsite tubes 12 is intended to provide context for the structure and operation of the apparatus 10, and embodiments of the present invention are not limited to or intended to include the wellsite tubes 12 unless the wellsite tubes are positively recited in the claims as required components of the apparatus 10.

Figure 2:
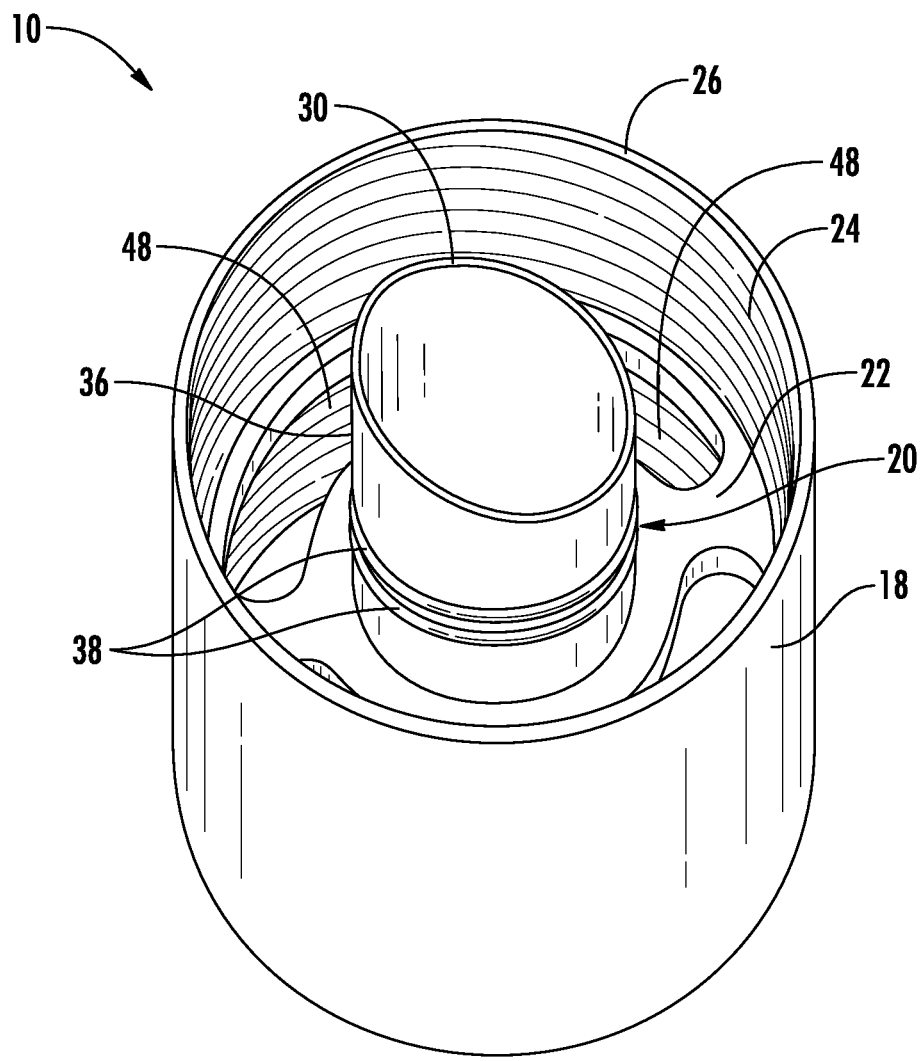
FIG. 2 is a top perspective view of the apparatus shown in FIG. 1.
Figure 3:
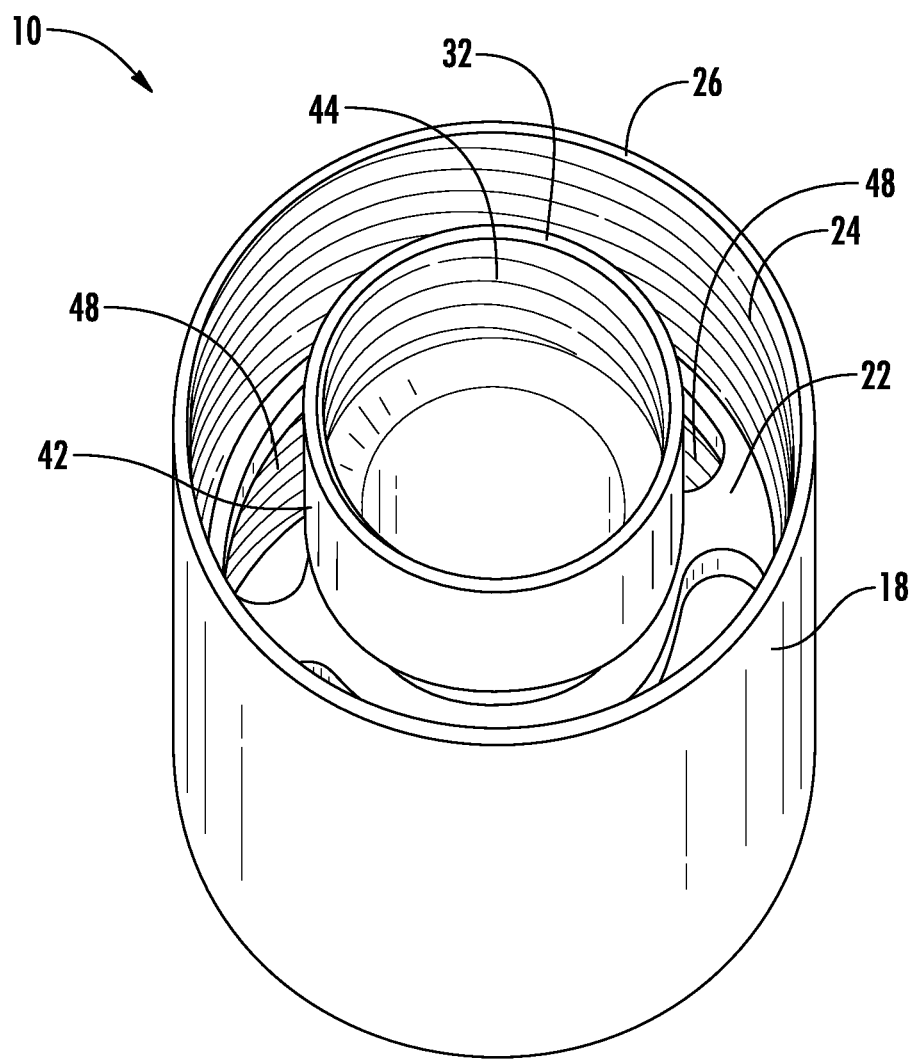
FIG. 3 is a bottom perspective view of the apparatus shown in FIG. 1.

FIG. 1 provides a side plan view of the apparatus 10 according to one embodiment of the present invention, and FIGS. 2 and 3 provide top and bottom perspective views, respectively, of the apparatus 10 shown in FIG. 1. As shown in FIGS. 1-3, the apparatus 10 generally includes a collar 18, a coupling 20, and a plurality of ribs 22 that extend radially between the collar 18 and the coupling 20.

As shown most clearly in FIG. 1, the collar 18 is configured to engage with the outer conduits 16 of adjacent wellsite tubes 12. Although illustrated as cylindrical, the collar may be square, triangular, oval, or any other geometric shape, and the present invention is not limited to any particular shape for the collar 18 unless specifically recited in the claims. The collar 18 may include various structures known in the art, such as male or female fittings, crimps, O-rings, clamps, threads, or quick release fittings, for releasably connecting to the outer conduits 16. The engagement between the collar 18 and the outer conduits 16 may be direct, with the collar 18 directly connected to the outer conduits 16. Alternately, the engagement between the collar 18 and the outer conduits 16 may be indirect, with a separate component between the collar 18 and the outer conduits 16. In the particular embodiment shown in FIGS. 1-3, the collar 18 includes internal threads 24 at opposing ends 26 of the collar 18 to engage with complementary external threads 28 of the outer conduit 16. In this manner, the internal threads 24 of the collar 18 may provide threaded engagement with the external threads 28 of the outer conduits 16 of adjacent wellsite tubes 12.

The coupling 20 is located at least partially inside the collar 18 and is configured to engage with the inner conduits 14 of adjacent wellsite tubes 12. The coupling 20 includes a first end 30 axially disposed from a second end 32. In particular embodiments, as shown in FIG. 1, the first end 30 of the coupling 20 may be tapered and/or extend axially outside of the collar 18 to facilitate locating and connecting the first end 30 of the coupling 30 to the inner conduit 14 of the wellsite tube 12. As shown in FIGS. 1 and 2, the coupling 20 includes a first means 34 configured to engage the first end 30 of the coupling 20 to the inner conduit 14 of the wellsite tube 12. The structure for engaging the first end 30 of the coupling 20 to the inner conduit 14 of the wellsite tube 12 may include one or more devices known in the art for releasably connecting fluid passages together, such as male or female fittings, crimps, O-rings, clamps, threads, or quick release fittings. In the particular embodiment shown in FIGS. 1 and 2, the first means 34 may also be configured to provide sliding engagement between the first end 30 of the coupling 20 and the inner conduit 14 of the wellsite tube 12. The sliding engagement between the first end 30 of the coupling 20 and the inner conduit 14 of the wellsite tube 12 provides flexibility to accommodate movement between the apparatus 10 and the wellsite tube 12. As shown in this particular embodiment, the structure for providing sliding engagement between the first end 30 of the coupling 20 and the inner conduit 14 of one wellsite tube 12 may be a male projection 36 with an optional seal 38. The male projection 36 may extend axially from the plurality of radially extending ribs 22 to fit inside the inner conduit 14 of the wellsite tube 12. The optional seal 38 may include one or more O-rings or sealing surfaces that circumferentially surround the outside of the male projection 36 to provide an enhanced fluid boundary between the male projection 36 and the inner conduit 14 of the wellsite tube 12.

As shown in FIGS. 1 and 3, the coupling 20 also includes a second means 40 configured to engage the second end 32 of the coupling 20 to the inner conduit 14 of another wellsite tube 12. The structure for engaging the second end 32 of the coupling 20 to the inner conduit 14 of the other wellsite tube 12 may include one or more devices known in the art for releasably connecting fluid passages together, such as male or female fittings, crimps, O-rings, clamps, threads, or quick release fittings. In the particular embodiment shown in FIGS. 1 and 3, the second means 40 may also be configured to provide threaded engagement between the coupling 20 and the inner conduit 14 of the other wellsite tube 12. The threaded engagement between the second end 32 of the coupling 20 and the inner conduit 14 of the other wellsite tube 12 provides a more secure connection between the apparatus 10 and the wellsite tube 12. As shown in this particular embodiment, the structure for providing threaded engagement between the second end 32 of the coupling 20 and the inner conduit 14 of the other wellsite tube 12 may be a female projection 42 with female threads 44. The female projection 42 may extend axially from the plurality of radially extending ribs 22 to fit outside the inner conduit 14 of the other wellsite tube 12. The female threads 44 may thus engage with complementary external threads 46 of the inner conduit 14 of the other wellsite tube 12 to more securely couple the apparatus 10 to the inner conduit 14 of the other wellsite tube 12.

As shown in FIGS. 1-3, the plurality of radially extending ribs 22 are located between the opposing ends 26 of the collar 18 and extend radially inward to support the coupling 20 inside the collar 20. As shown most clearly in FIGS. 2 and 3, a plurality of passages 48 between the radially extending ribs 22 provide fluid communication through the outer conduit 16 from upstream of the coupling 20 to downstream of the coupling 20. As shown in the particular embodiment shown in FIGS. 1-3, the plurality of radially extending ribs 22 may support the coupling 20 concentrically inside the collar 18. In particular embodiments, the ribs 22 may be press-fit, fixedly connected, or threaded to the collar 18 and/or the coupling 20. However, the embodiments of the present invention are not limited to any particular connection between the ribs 22 and the collar 18 and/or coupling 20 unless specifically recited in the claims.

Figure 4:
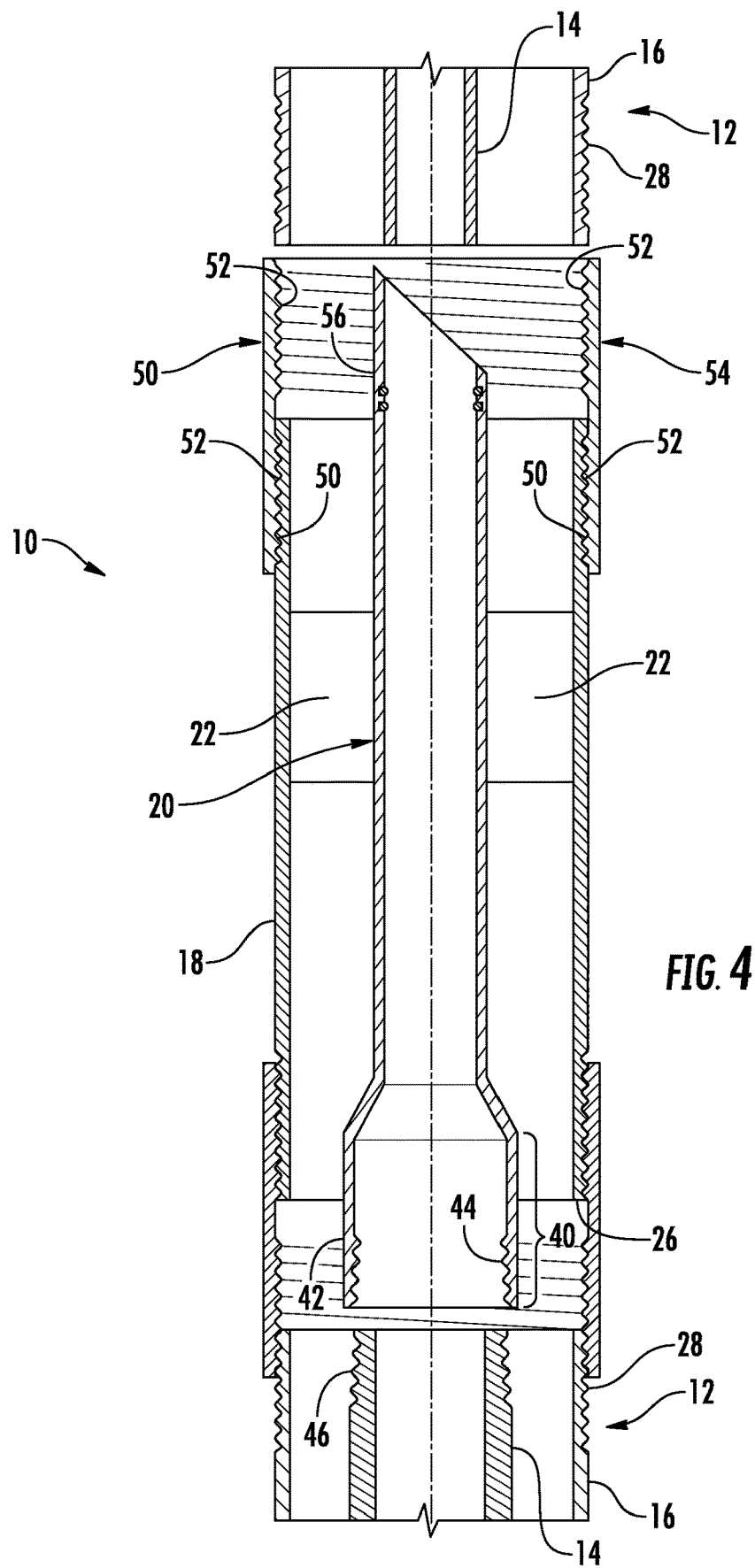
FIG. 4 is a side plan view of an apparatus according to an alternate embodiment of the present invention.

FIG. 4 provides a side plan view of the apparatus 10 according to an alternate embodiment of the present invention. In this particular embodiment, the apparatus 10 generally includes the collar 18, coupling 20, and plurality of ribs 22, as previously described with respect to the embodiment shown in FIGS. 1-3, with the differences described below.

As shown in FIG. 4, the collar 18 is again configured to engage with the outer conduits 16 of adjacent wellsite tubes 12. In this embodiment, however, the collar 18 includes external threads 50 at opposing ends 26 to engage with complementary internal threads 52 of a connector joint 54. The internal threads 52 of the connector joint 54 in turn engage with complementary external threads 28 of the outer conduits 16. In this manner, the collar 18 indirectly engages with the outer conduits 16 of the adjacent wellsite tubes 12 using the connector joint 54.

The coupling 20 is again located at least partially inside the collar 18 and is configured to engage with the inner conduits 14 of adjacent wellsite tubes 12. The first means 34 is again configured to engage the first end 30 of the coupling 20 to the inner conduit 14 of the wellsite tube 12, and the second means 40 is again configured to engage the second end 32 of the coupling 20 to the inner conduit 14 of another wellsite tube 12. In the particular embodiment shown in FIG. 4, the structure for the first means 34 is a female projection 56 with the optional seal 38. The female projection 56 may extend axially from the plurality of radially extending ribs 22 to fit outside the inner conduit 14 of the wellsite tube 12. The optional seal 38 may include one or more O-rings or sealing surfaces that circumferentially surround the inside of the female projection 36 to provide an enhanced fluid boundary between the female projection 36 and the inner conduit 14 of the wellsite tube 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An apparatus for connecting a first wellsite tube to a second wellsite tube, wherein each wellsite tube has an inner conduit and an outer conduit, comprising:
    a collar configured to engage with the outer conduits of the first and second wellsite tubes;
    a coupling disposed inside said collar, wherein said coupling comprises a first end axially disposed from a second end;
    a first means configured to provide sliding engagement between said first end of said coupling and the inner conduit of the first wellsite tube;
    a second means configured to provide threaded engagement between said second end of said coupling and the inner conduit of the second wellsite tube; and
    a radially extending rib disposed between said opposing ends of said collar, wherein said radially extending rib supports said coupling inside said collar,
    wherein said first means configured to provide sliding engagement between said first end of said coupling and the inner conduit of the first wellsite tube comprises a male projection and a seal, wherein said male projection extends axially from said radially extending rib and is configured to fit inside the inner conduit of the first wellsite tube, and said seal circumferentially surrounds said male projection between said male projection and the inner conduit of the first wellsite tube.

2. The apparatus as in claim 1, wherein said radially extending rib supports said coupling concentrically inside said collar.

3. The apparatus as in claim 1, wherein said second means configured to provide threaded engagement between said second end of said coupling and the inner conduit of the second wellsite tube comprises a female projection with female threads, wherein said female projection extends axially from said radially extending rib and is configured to fit outside of the inner conduit of the second wellsite tube, and said female threads are configured to provide threaded engagement with the inner conduit of the second wellsite tube.

4. The apparatus as in claim 1, further comprising a passage that provides fluid communication through said outer conduit from upstream of said coupling to downstream of said coupling.

5. An apparatus for connecting a first wellsite tube to a second wellsite tube, wherein each wellsite tube has an inner conduit and an outer conduit, comprising:
    a collar with internal threads at opposing ends, wherein said internal threads are configured to provide threaded engagement with the outer conduits of the first and second wellsite tubes;
    a coupling disposed inside said collar, wherein said coupling comprises a first end axially disposed from a second end;
    a first means configured to engage said first end of said coupling to the inner conduit of the first wellsite tube;
    a second means configured to engage said second end of said coupling to the inner conduit of the second wellsite tube; and
    a plurality of radially extending ribs disposed between said opposing ends of said collar, wherein said radially extending ribs support said coupling inside said collar,
    wherein said first means configured to engage said first end of said coupling to the inner conduit of the first wellsite tube comprises a male projection and a seal, wherein said male projection extends axially from said plurality of radially extending ribs and is configured to fit inside the inner conduit of the first wellsite tube, and said seal circumferentially surrounds said male interface between said male interface and the inner conduit of the first wellsite tube.

6. The apparatus as in claim 5, wherein said plurality of radially extending ribs support said coupling concentrically inside said collar.

7. The apparatus as in claim 5, wherein said first means configured to engage said first end of said coupling to the inner conduit of the first wellsite tube is configured to provide sliding engagement between said first end of said coupling and the inner conduit of the first wellsite tube.

8. The apparatus as in claim 5, wherein said second means configured to engage said second end of said coupling to the inner conduit of the second wellsite tube is configured to provide threaded engagement between said coupling and the inner conduit of the second wellsite tube.

9. The apparatus as in claim 5, wherein said second means configured to engage said second end of said coupling to the inner conduit of the second wellsite tube comprises a female projection with female threads, wherein said female projection extends axially from said plurality of radially extending ribs and is configured to fit outside of the inner conduit of the second wellsite tube, and said female threads are configured to provide threaded engagement with the inner conduit of the second wellsite tube.

10. The apparatus as in claim 5, wherein said first end of said coupling is tapered.

11. An apparatus for connecting a first wellsite tube to a second wellsite tube, wherein each wellsite tube has an inner conduit and an outer conduit, comprising:
    a collar with external threads at opposing ends, wherein said external threads are configured to provide threaded engagement with the outer conduits of the first and second wellsite tubes;
    a coupling disposed inside said collar, wherein said coupling comprises a first end axially disposed from a second end;
    a first means configured to engage said first end of said coupling to the inner conduit of the first wellsite tube;
    a second means configured to engage said second end of said coupling to the inner conduit of the second wellsite tube; and
    a plurality of radially extending ribs disposed between said opposing ends of said collar, wherein said radially extending ribs support said coupling inside said collar,
    wherein said first means configured to engage said first end of said coupling to the inner conduit of the first wellsite tube comprises a male projection and a seal, wherein said male projection extends axially from said plurality of radially extending ribs and is configured to fit inside the inner tube of the first wellsite tube, and said seal circumferentially surrounds said male interface between said male interface and the inner conduit of the first wellsite tube.

12. The apparatus as in claim 11, wherein said plurality of radially extending ribs support said coupling concentrically inside said collar.

13. The apparatus as in claim 11, wherein said first means configured to engage said first end of said coupling to the inner conduit of the first wellsite tube is configured to provide sliding engagement between said first end of said coupling and the inner conduit of the first wellsite tube.

14. The apparatus as in claim 11, wherein said first means configured to provide sliding engagement between said first end of said coupling and the inner conduit of the first wellsite tube comprises a female projection and a seal, wherein said female projection extends axially from said plurality of radially extending ribs and is configured to fit around the outer surface of the inner conduit of the first wellsite tube, and said seal circumferentially surrounds said female projection between said female projection and the inner conduit of the first wellsite tube.

15. The apparatus as in claim 11, wherein said second means configured to engage said second end of said coupling to the inner conduit of the second wellsite tube is configured to provide threaded engagement between said coupling and the inner conduit of the second wellsite tube.

16. The apparatus as in claim 11, wherein said second means configured to engage said second end of said coupling to the inner conduit of the second wellsite tube comprises a female projection with female threads, wherein said female projection extends axially from said plurality of radially extending ribs and is configured to fit outside of the inner conduit of the second wellsite tube, and said female threads are configured to provide threaded engagement with the inner conduit of the second wellsite tube.

17. The apparatus as in claim 11, wherein said first end of said coupling is tapered.

* * * * *